United States Patent
Spowart et al.

(10) Patent No.: US 11,313,778 B1
(45) Date of Patent: Apr. 26, 2022

(54) IN-SITU MICRO-VISCOMETRY FOR LOW-COST CURE MONITORING AND CONTROL

(71) Applicant: Government of the United States, as represented by the Secretary of the Air Force, Wright-Patterson AFB, OH (US)

(72) Inventors: Jonathan E. Spowart, Beavercreek, OH (US); Colin Rowbottom, Englewood, FL (US); Carly S. Hauser, Ripley, OH (US); Eric A. Lindgren, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 408 days.

(21) Appl. No.: 16/547,646

(22) Filed: Aug. 22, 2019

Related U.S. Application Data (60) Provisional application No. 62/859,401, filed on Jun. 10, 2019.

(51) Int. Cl.
*G01N 11/00* (2006.01)
*G01N 11/16* (2006.01)
*G01N 11/14* (2006.01)

(52) U.S. Cl.
CPC ............ *G01N 11/00* (2013.01); *G01N 11/16* (2013.01); *G01N 2011/002* (2013.01); *G01N 2011/006* (2013.01); *G01N 2011/147* (2013.01); *G01N 2203/0094* (2013.01)

(58) Field of Classification Search
CPC .... G01N 11/142; G01N 11/165; G01N 11/16; G01N 2011/147
See application file for complete search history.

(56) References Cited

U.S. PATENT DOCUMENTS 5,383,349 A * 1/1995 Blake-Coleman ..... G01N 9/002
73/32 A

OTHER PUBLICATIONS

Sánchez, A. M.; Prieto, R; Laso, M.; Riesgo, T.; A Piezoelectric Minirheometer for Measuring the Viscosity of Polymer Microsamples, IEEE Transactions on Industrial Electronics, 2008, 55, 1, 427.

* cited by examiner

*Primary Examiner* — Paul M. West
(74) *Attorney, Agent, or Firm* — AFMCLO/JAZ; James F. McBride (57) ABSTRACT

The present invention relates to devices for measuring property changes via in-situ micro-viscometry and methods of using same. The aforementioned device is inexpensive and can be used to quickly and accurately measure numerous physical and chemical property changes, including but not limited to the rate of chemical cure, change in tack, and rate of mass loss, for example, rate of moisture, solvent and/or plasticizer change.

9 Claims, 7 Drawing Sheets

IN-SITU MICRO-VISCOMETRY FOR LOW-COST CURE MONITORING AND CONTROL

CROSS-REFERENCE TO RELATED APPLICATION

The present application claims priority to U.S. Provisional Application Ser. No. 62/859,401 filed Jun. 10, 2019, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to devices for measuring property changes via in-situ micro-viscometry and methods of using same.

BACKGROUND OF THE INVENTION

Properties of materials such rate of chemical cure, change in tack, and rate of mass loss, for example, rate of moisture, solvent and/or plasticizer change are important property changes that must be known for many industrial processes as they are key to quality control. While attempts have been made to meet the need for a device that can measure such properties, current devices are limited to a narrow range of frequencies such as 20 kilohertz to 200 kilohertz. Applicants recognized that there are numerous processes and properties that do not fit the aforementioned time scale which is why the prior devices did not suffice. Thus, Applicants disclose an inexpensive, accurate device that operates on a time scale of about 0.02 hertz to 20 kilohertz. Applicants' device can be used to quickly measure numerous physical and chemical property changes, including but not limited to the rate of chemical cure, change in tack, and rate of mass loss, for example, rate of moisture, solvent and/or plasticizer change.

SUMMARY OF THE INVENTION

The present invention relates to devices for measuring property changes via in-situ micro-viscometry and methods of using same. The aforementioned device is inexpensive and can be used to quickly and accurately measure numerous physical and chemical property changes, including but not limited to the rate of chemical cure, change in tack, and rate of mass loss, for example, rate of moisture, solvent and/or plasticizer change.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Device for Measuring Property Changes Via In-Situ Micro-Viscometry

Figure 1A:
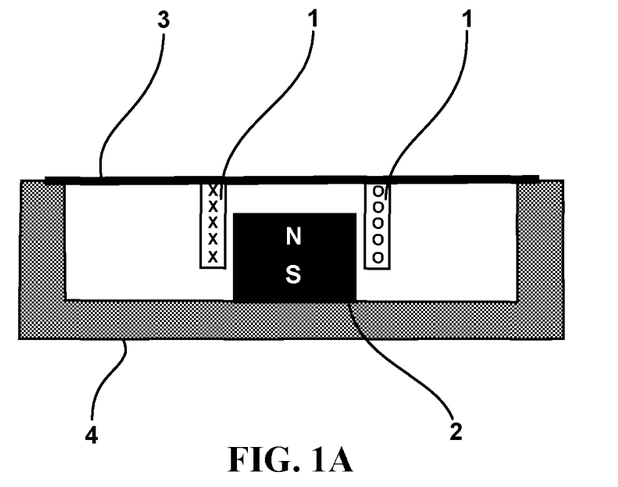
FIG. 1A is a cross-sectional view of a sensor comprising a magnet with North South polarity.
Figure 1B:
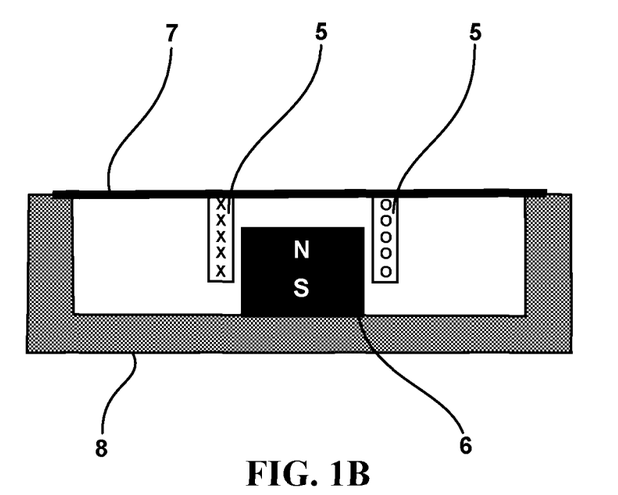
FIG. 1B is a cross-sectional view of an actuator comprising a magnet with North South polarity.
Figure 2A:
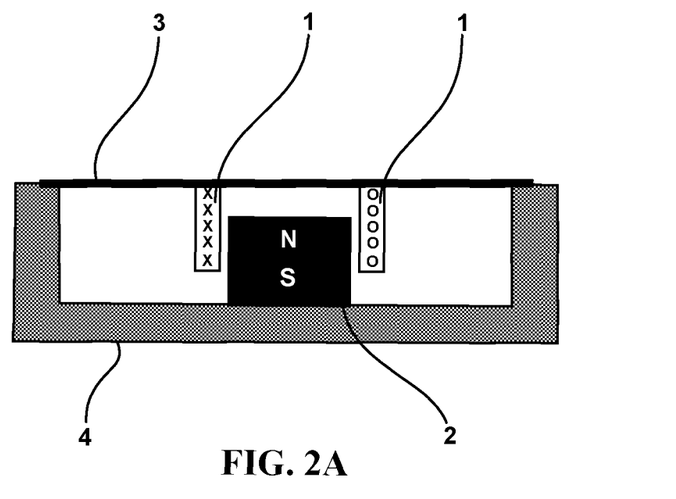
FIG. 2A is a cross-sectional view of a sensor comprising a magnet with North South polarity.
Figure 2B:
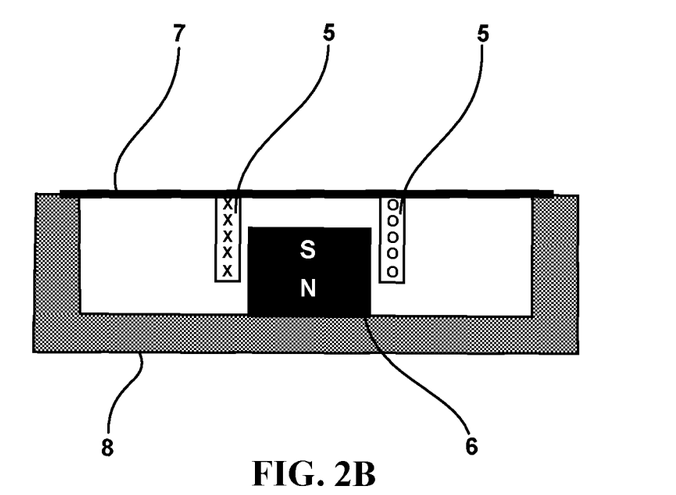
FIG. 2B is a cross-sectional view of an actuator comprising a magnet with South North polarity.
Figure 5:
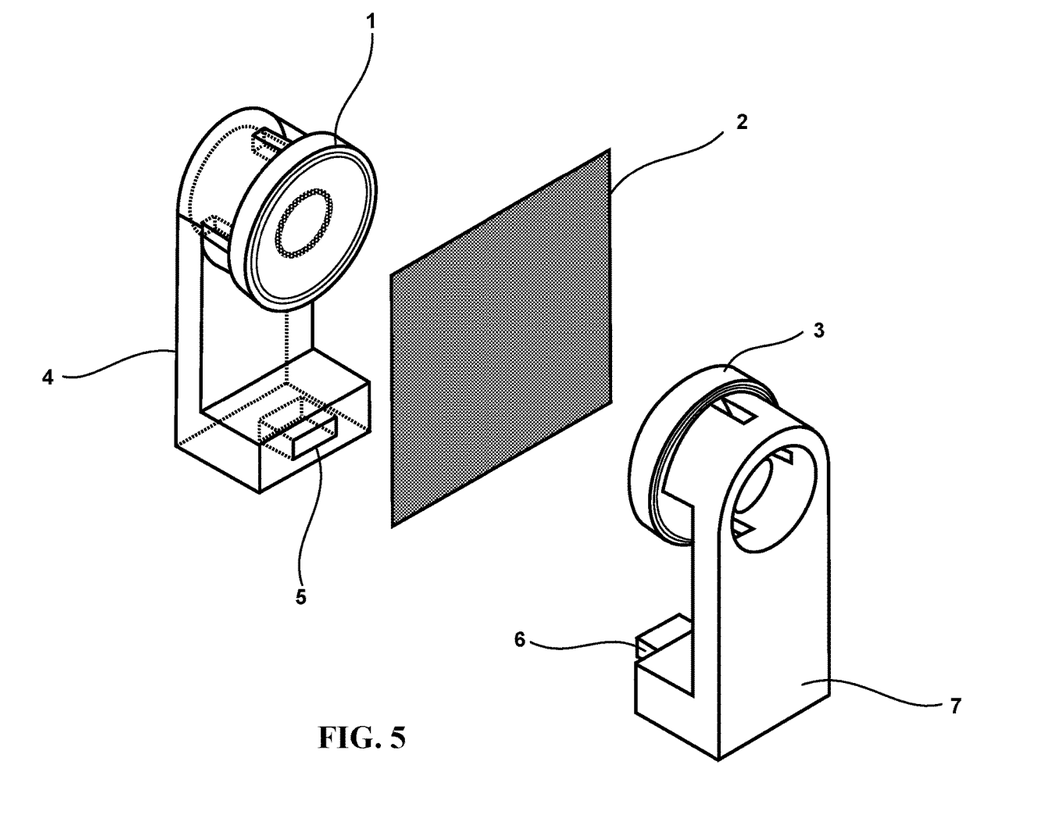
FIG. 5 is an exploded view of a fixture that can be used when a sensor's magnet and an actuator's magnet have same polarities.
Figure 6:
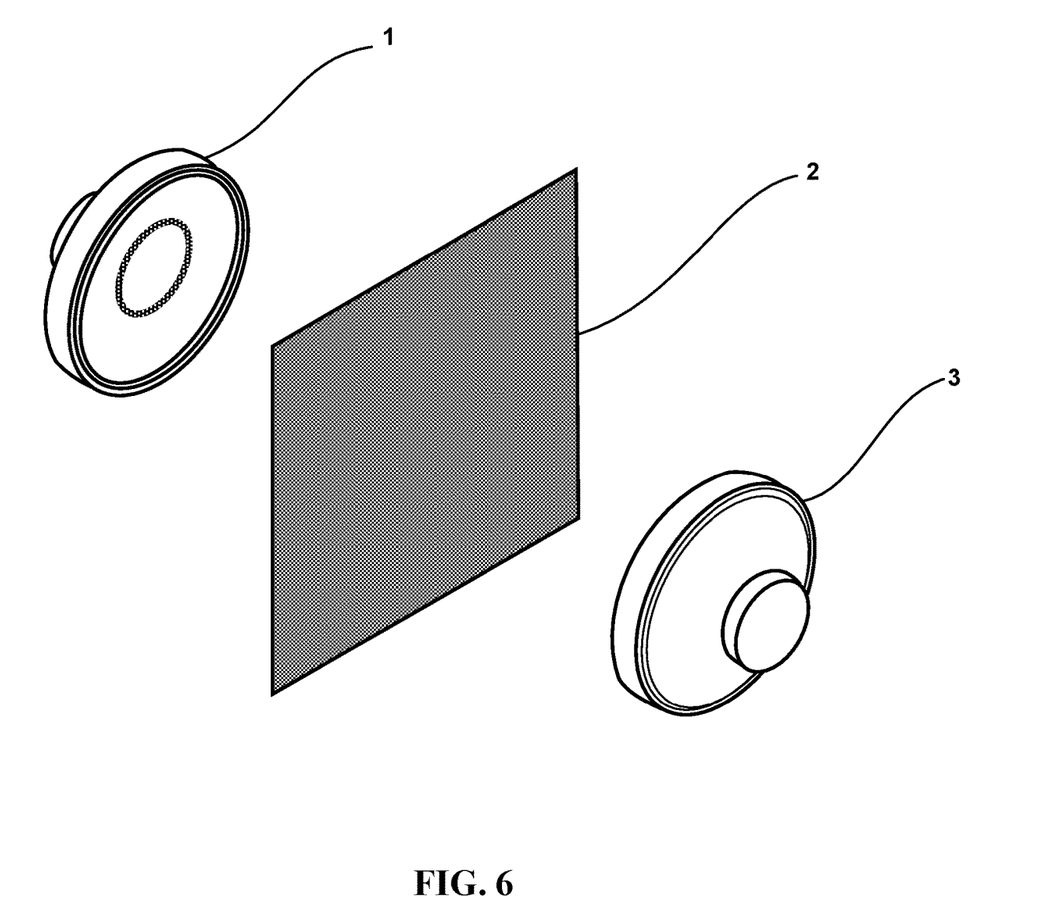
FIG. 6 is an exploded view showing how the device wherein the sensor magnet and actuator magnet pair have opposite polarities can be used without a fixture.
Figure 7:
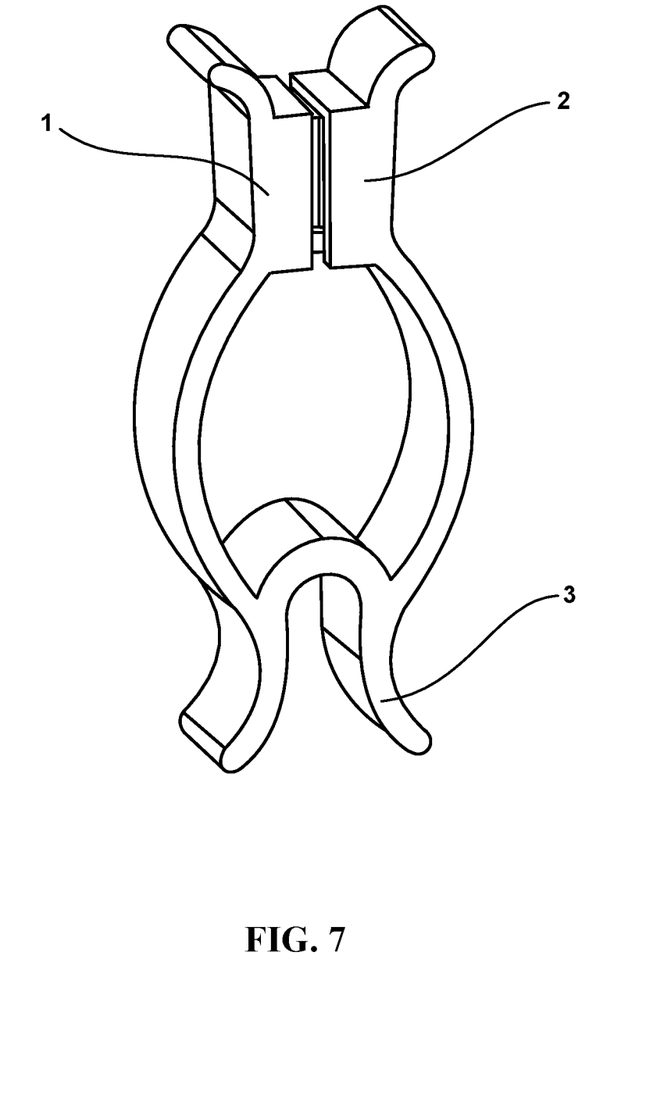
FIG. 7 is a side view of a fixture with cavities for an actuator and a sensor.

Applicants disclose a device comprising an actuator and a sensor:
  a) said sensor comprising a frame, a magnet, a coil having an electrical connection and a membrane having a periphery, said magnet, coil and membrane being disposed in said frame, said membrane being further physically connected to said frame at said membrane's periphery, said coil being concentric to said magnet but not in physical contact with said magnet, said coil being bonded to said membrane said membrane not being in physical contact with said magnet, said magnet being attached to said frame opposite of said membrane;

b) said, actuator comprising a frame, a magnet, a coil having an electrical connection and a membrane having a periphery, said membrane being further physically connected to said frame at said membrane's periphery said coil being concentric to said magnet but not in physical contact with said magnet, said coil being bonded to said membrane, said membrane not being in physical contact with said magnet, said magnet being attached to said frame opposite of said membrane;

said sensor's magnet and said actuator's magnet having opposite polarities or sensor's magnet and said actuator's magnet having the same polarities, when said sensor's magnet and said actuator's magnet have the same polarities said device further comprising a fixture in which said sensor and said actuator are disposed. FIGS. 1A-1B provide a cross-sectional views of one embodiment of a sensor FIG. 1A and an actuator FIG. 1B where the sensor's magnet 2 and the actuator's magnet 6 have same polarity. Sensor's magnet 2 is magnet is attached to frame 4 opposite of membrane 3 and the actuator's magnet 6 is attached to frame 8 opposite of membrane 7. The sensor's magnet 2 has coil 1 wrapped around sensor's magnet 2 without touching sensor's magnet 2 and the actuator's magnet 6 has coil 5 wrapped around sensor's magnet 6 without touching sensor's magnet 6. Sensor's membrane 3 is physically connected to frame 4 at said membrane's periphery. Actuator's membrane 7 is physically connected to frame 8 at said membrane's periphery. FIGS. 2A-2B provide a cross-sectional views of one embodiment of a sensor FIG. 2A and an actuator FIG. 2B where the sensor's magnet 2 and the actuator's magnet 6 have opposite polarity. The sensor's magnet 2 has coil 1 wrapped around sensor's magnet 2 without touching sensor's magnet 2 and the actuator's magnet 6 has coil 5 wrapped around sensor's magnet 6 without touching sensor's magnet 6. Sensor's magnet 2 is magnet is attached to frame 4 opposite of membrane 3 and the actuator's magnet 6 is attached to frame 8 opposite of membrane 7. Sensor's membrane 3 is physically connected to frame 4 at said membrane's periphery. Actuator's membrane 7 is physically connected to frame 8 at said membrane's periphery. FIG. 5 provides an exploded view of one embodiment of device where in sensor's magnet and actuator's magnet have same polarities. Thus a fixture that keeps said magnet's forces from separating the sensor and actuator is advantageous. Thus, in FIG. 5, actuator 1, known mass of material test material 2, sensor 3, first half 4 of fixture, locating socket 5, locating pin 6 and second half of fixture 7 are shown. FIG. 6 provides an exploded view of one embodiment of the device wherein sensor's magnet and actuator's magnet have opposite polarities. As sensor's magnet and actuator's magnet have opposite polarities, a fixture is not required. Thus, FIG. 6 actuator 1, known mass of material test material 2, sensor 3 are shown. FIG. 7 provides one embodiment of fixture with cavities for actuator and sensor. In FIG. 7, actuator cavity 1, sensor cavity 2 and spring clip 3 are shown.

Figure 4:
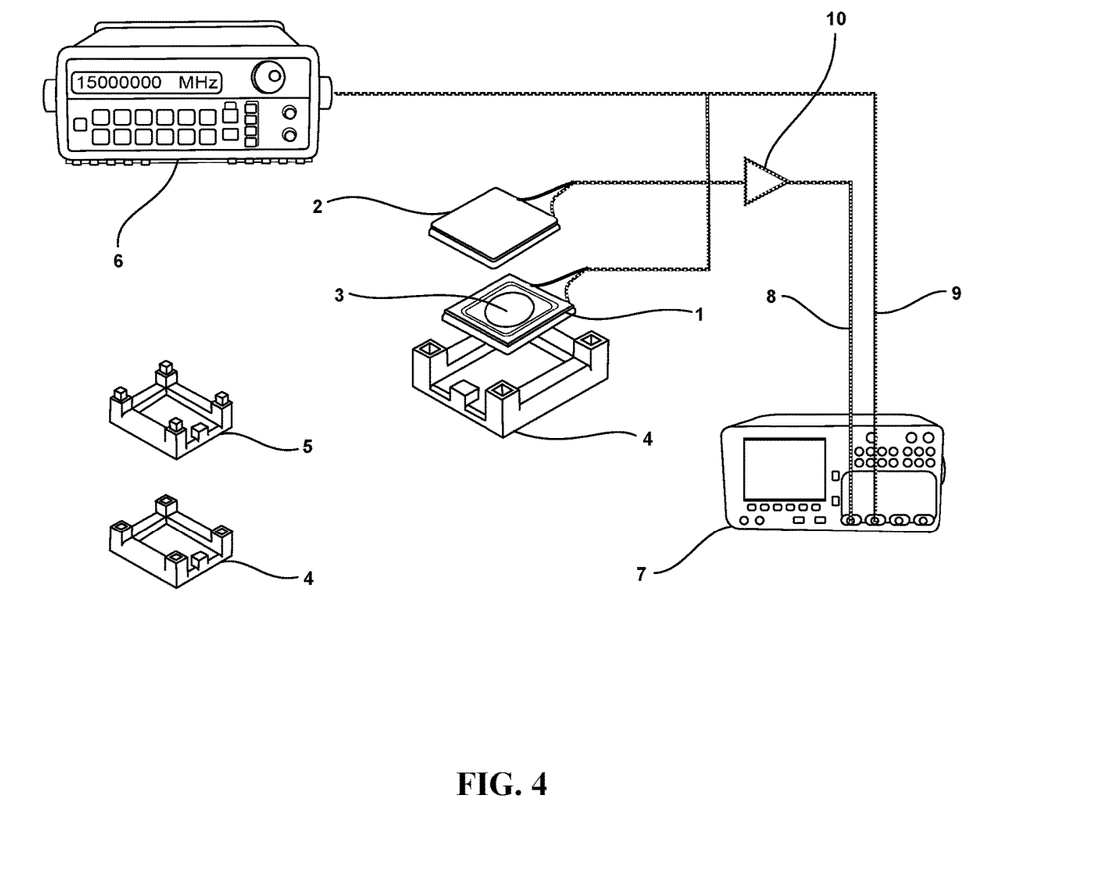
FIG. 4 is an exploded view of a device with the sensor's magnet and the actuator's magnet having the same polarities with the amplifier connected between the sensor's coil and the waveform measuring device.

Applicants disclose the device of Paragraph 0022 comprising an alternating current signal source, an amplifier, and a waveform measuring device, said amplifier being electrically connected to said waveform measuring device and to said sensor's coil's electrical connection; said alternating current signal source being connected to said actuator's coil's electrical connection. FIG. 4 is an exploded view of one embodiment of such device wherein sensor's magnet and actuator's magnet having same polarities and without amplifier connected between sensor's coil and waveform measuring device. Such device comprise actuator 1, sensor 2, known mass of material 3 that is the test material, lower half of fixture 4, upper half of fixture 5, alternating current signal source 6, waveform measuring device 7, output electrical signal from sensor 8, input electrical signal from alternating current signal source 9 and an external amplifier 10.

Figure 3:
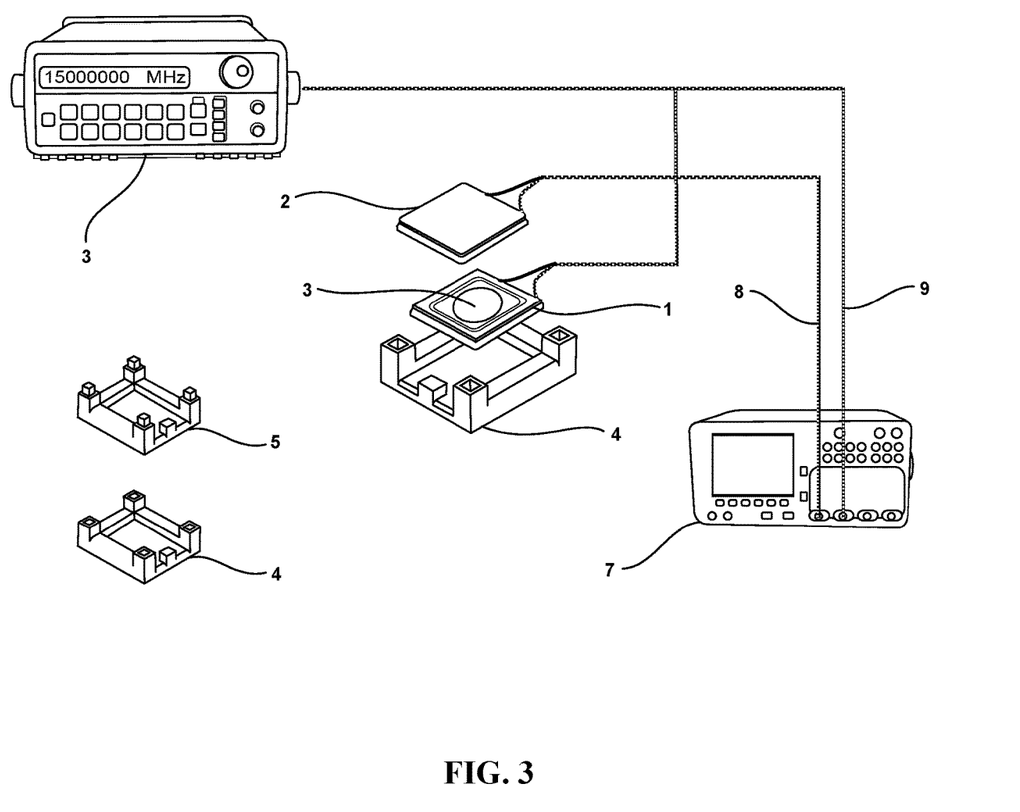
FIG. 3 is an exploded view of a device with the sensor's magnet and the actuator's magnet having same polarities and without an amplifier connected between the sensor's coil and the waveform measuring device.

Applicants disclose the device of Paragraph 0022 comprising an alternating current signal source and a waveform measuring device comprising an amplifier, said waveform measuring device being connected to said sensor's coil's electrical connection; said alternating current signal source being connected to said actuator's coil's electrical connection. FIG. 3 is an exploded view of one embodiment of such device wherein sensor's magnet and actuator's magnet having same polarities and without amplifier connected between sensor's coil and waveform measuring device. Such device comprise actuator 1, sensor 2, known mass of material 3 that is the test material, lower half of fixture 4, upper half of fixture 5, alternating current signal source 6, waveform measuring device 7 comprising an internal amplifier, output electrical signal from sensor 8 and input electrical signal from alternating current signal source 9. Suitable alternating current signal sources, amplifiers, waveform measuring devices and waveform measuring devices comprising an amplifier include but are not limited to Agilent 33120A Arbitrary Function Generator, Agilent DSO5054A Digital Storage Oscilloscope, and Analog Devices 0P07D precision Operational Amplifier. Such alternating current signal sources, amplifiers, waveform measuring devices and waveform measuring devices comprising an amplifier can be obtained from ValueTronics International, Inc., Elgin, Ill. 60123 USA, or Digi-Key Electronics, Inc., Thief River Falls, Minn. 56701 USA.

Applicants disclose a device according to any of Paragraphs 0022 through 0024, wherein a) said sensor's
   (i) frame comprising a non-magnetic metal and/or a ceramic, preferably said frame consists essentially of a non-magnetic metal and/or a ceramic;
   (ii) magnet having a Curie temperature above the Curie temperature above the operational temperature of said device, preferably said magnet is a samarium-cobalt magnet or a neodymium magnet;
   (iii) coil having a modulus of elasticity and tensile strength at the operational temperature of said device that is at least 75%, preferably at least 90%, more preferably at least 95%, most preferably at least 99% of the modulus of elasticity and tensile strength of said coil at 25° C., preferably said coil comprises copper, an alloy of copper, tungsten, an alloy of tungsten and/or a refractory alloy; and
   (iv) membrane having a modulus of elasticity and tensile strength at the operational temperature of said device that is at least 75% preferably at least 90%, more preferably at least 95%, most preferably at least 99% of the modulus of elasticity and tensile strength of said coil at 25° C., preferably said membrane comprises steel, titanium, an alloy of titanium, nickel, an alloy of nickel, aluminum and/or an alloy of aluminum;
b) said actuator's
(i) frame comprising a non-magnetic metal and/or a ceramic, preferably said frame consists essentially of a non-magnetic metal and/or a ceramic;
(ii) magnet having a Curie temperature above the Curie temperature above the operational temperature of said device, preferably said magnet is a samarium-cobalt magnet or a neodymium magnet;
(iii) coil having a modulus of elasticity and tensile strength at the operational temperature of said device that is at least 75% preferably at least 90%, more preferably at least 95%, most preferably at least 99% of the modulus of elasticity and tensile strength of said coil at 25° C., preferably said coil comprises copper, an alloy of copper, tungsten, an alloy of tungsten and/or a refractory alloy; and
(iv) membrane having a modulus of elasticity and tensile strength at the operational temperature of said device that is at least 75% preferably at least 90%, more preferably at least 95%, most preferably at least 99% of the modulus of elasticity and tensile strength of said coil at 25° C., preferably said membrane comprises steel, titanium, an alloy of titanium, nickel, an alloy of nickel, aluminum and/or an alloy of aluminum;
said fixture, when present, comprising a non-magnetic metal and/or a ceramic. This embodiment allows the device to operate at extended operational temperatures, including but not limited to, a temperature of from about −196° C. to about 500° C.

Applicants disclose the device according to any of Paragraphs 0022 through 0025, said device having an operational range of from about 0.02 hertz to about 20 kilohertz, preferably said device having an operational range of from about 20 hertz to about 5 kilohertz, more preferably said device having an operational range of from about 100 hertz to about 2 kilohertz. The recited ranges are the ranges typically found for liquid polymers curing into solids during the overall course of curing. In addition, such ranges encompass ideal ranges for items including but not limited to solvent loss liquid resins over time.

Applicants' device can be produced inexpensively, with minimal size, weight and power (SWAP) requirements, and that can be used to measure quantitative changes in material properties over time, using the techniques of micro-viscometry. The device comprises an electromechanical actuator and an electromechanical sensor in close proximity and disposed on opposite sides of the material under test, which is in direct contact with both the actuator and the sensor. The electromechanical actuator is energized by an alternating voltage signal of known frequency which causes it to impose a cyclic displacement on the material under test, at the same known frequency. The material responds mechanically to the imposed cyclic displacement by moving in a manner related to (i) the imposed displacement and (ii) the material's viscoelastic properties. The movement of the material under test imposes a displacement on the electromechanical sensor which in turn causes an electrical signal in its electrical connection. This electrical signal is directly related to the amplitude, frequency and phase of the motions of the material under test. The relationships between the amplitude, frequency and phase of the input signal to the electromechanical actuator and the amplitude, frequency and phase of the output signal from the electromechanical sensor reveal information about the viscoelastic properties of the material under test, as a function of time.

The actuator and the sensor must be correctly disposed on either side of the material under test, to be in direct contact with it. The actuator and the sensor contain magnetic components, so the polarity of the magnets is important to the invention. If the magnets are of the same polarity then they will repel each other through magnetic forces and so the actuator-sensor pair must be securely held in a mechanical fixture. This also serves to position the actuator-sensor pair at the correct distance from each other, so that they maintain contact with the known volume of material which is under test.

If the magnets of the actuator-sensor pair have opposite polarities, then they will attract each other through magnetic forces, which can be an advantage in certain circumstances, i.e. when the material under test is a solid or highly-viscous material or in the form of a sheet. In which case, there is no need for a fixture to correctly dispose the actuator and sensor since they will clamp themselves onto the material under test. For less viscous materials, there may only need to be a "spacer" in order to position the actuator-sensor pair at the correct distance from each other, so that they maintain contact with the known volume of material without extruding it from in-between.

The dynamic range of frequencies of the device is very broad, from effectively DC to over 20,000 Hz. This large dynamic range affords the device flexibility in terms of the different materials that it can measure, including solids, rubbers, liquids, gels, foams, slurries, solutions and suspensions. In addition, the device operates with a small amount of material, which makes it suitable for testing experimental materials in a laboratory setting where quantities are limited due to availability, and also for testing production materials in an industrial setting where quantities are limited due to cost margins and/or production schedules. The device can be tailored for different materials by changing the size and power of the particular electromechanical actuator and sensor combination. Stiffer materials may require larger actuators; however, low-viscosity fluids could be measured with very small and low-power actuators, leading to opportunities for miniaturization of the device.

3-D printing and other digital additive manufacturing techniques can be utilized in fabricating the assembly fixture. These manufacturing techniques have the advantage of being easily customizable, allowing for rapid prototyping of different fixtures with different designs. Several different designs were attempted before settling on the disclosed design—which is appropriate for actuator-sensor pairs which have magnets of the same polarity—however, other fixture designs are equally valid. In the disclosed designs, the two halves of the fixture are adhesively bonded once the material specimen has been inserted between the actuator and sensor. Other fixture designs include spring clips and other compliant mechanisms that clamp onto the specimen itself.

The alternating current signal source can be any frequency-controlled function generator that has power to drive the actuator. In most cases, the signal waveform will be sinusoidal, but other waveforms such as square, rectangular, triangular or sawtooth can also be employed. This aspect of the device can be miniaturized—standard single chip packaged, circuit board mounted frequency generators can be obtained from commercial vendors.

The waveform measuring device can be any electronic device that can measure the frequency, amplitude and phase of the output signal from the sensor, and compare it to the frequency, amplitude and phase of the input signal to the actuator. This aspect of the device can also be miniaturized—standard single chip packaged, circuit board mounted waveform analyzers can also be obtained from commercial vendors.

If an amplifier is necessary to increase the amplitude of the sensor output, this too can be any type of voltage amplifier with suitable performance characteristics such as controllable gain, high input impedance and low output impedance. Operational Amplifiers of the 741-type, for example, can be obtained from commercial vendors and are well-suited for this purpose. When selecting an amplifier, care should be taken to observe any parasitic phase-shifts associated with signal amplification, since this is an important waveform characteristic that will be measured by the waveform-measuring device.

The overall geometries of the actuator and sensor are in general planar, but their shape can be either rectangular or square with rounded corners, or oval, or circular, depending on the application.

Method of Using Device for Measuring Property Changes Via In-Situ Micro-Viscometry For purposes of this specification, headings are not considered paragraphs and thus this paragraph is Paragraph 0036 of the present specification. The individual number of each paragraph above and below this paragraph can be determined by reference to this paragraph's number. In this Paragraph 0036, Applicants disclose a method of determining the rate of chemical cure, change in tack, and/or rate of mass loss of a known mass of material using a device according to any preceding claim, said method comprising measuring the phase lag between a first and a second signal, said first signal being a signal from said device's alternating current signal source and said second signal being a signal from said device's sensor, said known mass of material being disposed between said device's actuator and said device's sensor.

Applicants disclose a method according to Paragraph 0036 wherein said first signal has a frequency of from about 0.02 hertz to about 20 kilohertz, preferably said device having an operational range of from about 20 hertz to about 5 kilohertz, more preferably said device having an operational range of from about 100 hertz to about 2 kilohertz.

Applicants disclose a method according to Paragraphs 0036 through 0037 wherein said first signal is an alternating current signal and said second signal is an alternating current signal, preferably said first signal is a square wave, a triangle wave, a sawtooth wave, sine wave, more preferably said first signal is a sine wave. The second signal mirrors the nature of the first signal.

Applicants disclose a method according to Paragraphs 0036 through 0038 wherein said device is the device of Paragraph 0025 and the device operational temperature is from about 60° C. to about 500° C., preferably from about 100° C. to about 500° C., more preferably from about 190° C. to about 500° C.

Applicants disclose a method according to Paragraphs 0036 through 0038 wherein said device is the device of Paragraph 0025 and the device operational temperature is from about −196° C. to about 0° C., preferably from about −196° C. to about −20° C., more preferably from about −196° C. to about −60° C.

Applicants disclose a process of measuring the changes in a material's visco-elastic properties over time, as a function of frequency. In some cases, the temperature of the material is also changing over time, either continuously as in a temperature ramp, or in steps of known temperature change. The frequency at which the device is operating is typically swept, i.e. increased from a lower frequency to a higher frequency, or decreased from a higher frequency to a lower frequency in a series of known (small) steps. This frequency sweep is continuously repeated during the experiment. These kinds of experiments are also known as acoustic rheology experiments due to the ranges of frequencies typically studied.

Applicants disclose a process whereby the device containing the material under test is placed inside a heated chamber (oven) or cooled chamber (refrigerator) in order to effect a change in the viscoelastic properties of the material, either through advancing its state of chemical cure, or by reducing the amount of moisture present, or through removal of solvent from a solvated solution, or via combinations of all three.

Applicants disclose a process whereby the device containing the material under test is placed inside a heated chamber (oven) or cooled chamber (refrigerator) under controlled humidity conditions, in order to effect a change in the viscoelastic properties of the material, either through advancing its state of chemical cure, or by increasing the amount of moisture present, or through chemical or physical degradation by moisture, or via combinations of all three.

Applicants disclose a process whereby the device containing the material under test is placed inside an environmental chamber such as a vacuum chamber with or without heating and/or cooling, or pressure chamber with or without heating and/or cooling, in order to effect a change in the viscoelastic properties of the material.

The use of environmental chambers is commonplace when trying to experimentally mimic the service conditions that a material might experience, as part of durability testing.

Applicants disclose a process wherein the material under test is introduced into the space between the sensor and actuator using a hypodermic syringe or automatic pipette. This process allows the precise, known volume of material to be placed in the correct position in the device.

Applicants disclose a process whereby the alternating current signal source is connected to the input terminals of the actuator and also in parallel with one set of input terminals of the waveform measuring device, and the output from the sensor is connected (either with or without an amplifier) to the other set of input terminals on the waveform measuring device. This arrangement allows the waveform measuring device to measure changes in the difference between the amplitude, frequency and phase of the signals on each of the input terminals and therefore allow calculation of the change in viscoelastic properties of the material under test.

Applicants disclose a process wherein a custom Labview® Virtual Instrument (VI), hosted on a laptop computer with an analog-digital converter, is used as the waveform measuring device. The Labview® VI is used to measure the amplitude, frequency and phase of both the actuator input waveform and the sensor output waveform, and to compute the differences between them, in order to perform the viscoelastic analysis of the material.

Applicants disclose a process wherein the device containing the material under test is placed into an air-circulating oven for a continuous, extended period of time (days/weeks/months) whilst periodic (hourly or daily) viscoelastic measurements are made over a range of frequencies. The alternating current signal source and the waveform measuring device are outside the oven, and connected by wires to the device inside the oven, across the door seal.

Applicants disclose a process whereby the viscoelastic properties of the material under test are calculated according to the following relationships:

$$\eta^* = \frac{G^*}{\omega} = \frac{G'}{\omega} + i\frac{G''}{\omega}$$

$$\eta = |\eta^*|$$

$$\frac{\Delta G'}{G'} = \frac{\Delta f^*}{f^*}$$

$$\frac{\Delta G''}{G''} = \Delta\left(\frac{A^o}{A^i}\right)$$

$$\frac{dG'}{dt} = \frac{df^*}{dt}$$

$$\frac{dG''}{dt} = \frac{d}{dt}\left(\frac{A^o}{A^i}\right)$$

Here, $\eta^*$ is the complex viscosity of the material under test; $G^*$ is the complex shear modulus; $\omega$ is the angular frequency of the alternating current supply signal; $G'$ is the storage modulus; $G''$ is the loss modulus; i is the imaginary number $\sqrt{-1}$; $\eta$ is the viscosity;

$$\frac{\Delta G'}{G'}$$

is the proportional change in storage modulus:

$$\frac{\Delta f^*}{f^*}$$

is the proportional change in $f^*$; $f^*$ is the frequency at which the phase difference between (i) the actuator input signal and (ii) the sensor output signal as measured by the waveform measuring device is 90-degrees or $\pi/2$;

$$\frac{\Delta G''}{G''}$$

is the proportional change in loss modulus; $A^o$ is the amplitude of the sensor output signal; $A^i$ is the amplitude of the actuator input signal;

$$\frac{dG'}{dt}$$

is the rate of change of storage modulus with respect to time;

$$\frac{df^*}{dt}$$

is the rate of change of $f^*$ with respect to time;

$$\frac{dG''}{dt}$$

is the rate of change of loss modulus with respect to time;

$$\frac{d}{dt}\left(\frac{A^o}{A^i}\right)$$

is the rate of change of $A^o/A^i$ with respect to time.

Applicants disclose a method by which only one actuator is used to effect the measurement of mass change of the material under test, without the use of the sensor. For example, to measure the mass loss, a known mass of material is introduced onto the membrane of the actuator and the actuator is connected to the output of a frequency-controlled alternating current signal source. The actuator is then brought into resonance by selecting a signal frequency $f^*$ at which the electrical impedance of the actuator is at a minimum, as measured using an impedance analyzer. As the material under test loses mass, the resonant frequency increases according to the following relationship:

$$\frac{\Delta m}{m} = \left(\frac{\Delta f^*}{f^*}\right)^2$$

The rate of change of mass with respect to time can therefore be related to the rate of change of resonant frequency with respect to time:

$$\frac{dm}{dt} = \left(\frac{df^*}{dt}\right)^2.$$

Test Methods

Method of Method of determining frequency of operation. For the purpose of this specification, the following method shall be used:
1) Obtain a calibrated waveform generator such as a frequency generator or arbitrary function generator.
2) Set the frequency of the calibrated waveform generator to the required frequency.
3) Set the amplitude of the waveform to an appropriate level.
4) Obtain a calibrated frequency measuring device such as a digital phosphor oscilloscope (DPO) or other calibrated frequency meter such as a frequency analyzer.
5) Set the input gain of the calibrated frequency measuring device to an appropriate level.
6) Electrically connect the output of the calibrated waveform generator to the input of the calibrated frequency measuring device
7) Measure and record the frequency of operation.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

A known amount of degassed Epon 828 epoxy resin plus Jeffamine D230 curing agent was introduced between the actuator and sensor of the device using a hypodermic syringe. The magnets of the actuator and sensor had the same polarities, and therefore a fixture was necessary to correctly dispose the two. The device was left on the benchtop at room temperature (approximately 25° C.) to cure over a period of 6 hours. The frequency f* at which the phase angle between the actuator input signal and the sensor output signal was 90° was measured and recorded as a function of time, according to Table 1:

TABLE 1

| Elapsed time [hours] | Frequency f* [Hz] |
| --- | --- |
| 0 | 900 |
| 1 | 799 |
| 2 | 670 |
| 3 | 630 |
| 4 | 560 |
| 5 | 470 |
| 5.75 | 420 |

The experimental data showed a linear decrease in f* as a function of time. Since there was no mass loss associated with the epoxy curing reaction, the proportional change in storage modulus was calculated to be proportional to the proportional change in f*, indicating a linear rate of cure for the Epon 828 epoxy resin over the 6-hour experiment.

Example 2: A single sheet of woven glass fiber material, pre-impregnated with a known amount of Epon 828 epoxy resin plus Jeffamine D230 curing agent was introduced between the actuator and sensor of the device, inside an oven set to a temperature of 30±0.1° C. The actuator and sensor were circular in shape, and their magnets were of opposite polarities, requiring no fixture to correctly dispose them during the experiment. The experiment was run inside the oven for 16.5 hours whilst sensor output waveform data was acquired every 6 minutes. The experimental data showed an initial value of $f_0^*$=670.90 Hz, with a steady decrease in f* as a function of time, reaching a limiting value of $f_\infty^*$=373.58 Hz after 8.2 hours at which point the material under test was considered fully cured. The degree of cure (DOC) of the pre-impregnated material as a function of time was calculated based on the following relationship:

$$DOC = 1 - \left(\frac{f^* - f_\infty^*}{f_0^* - f_\infty^*}\right)$$

Here, $f_0^*$ is the initial recorded value of f* at time t=0; $f_\infty^*$ is the final recorded value of f* when the material is considered fully cured.

Example 3: A single sheet of woven glass fiber material, pre-impregnated with a known amount of Epon 828 epoxy resin plus Jeffamine D230 curing agent was introduced between the actuator and sensor of the device, inside an oven set to a temperature of 40±0.1° C. The actuator and sensor were circular in shape, and their magnets were of opposite polarities, requiring no fixture to correctly dispose them during the experiment. An experiment was carried out that was similar in all key aspects to the experiment described in Example 2, but at the higher temperature.

Example 4: A single sheet of woven glass fiber material, pre-impregnated with a known amount of Epon 828 epoxy resin plus Jeffamine D230 curing agent was introduced between the actuator and sensor of the device, inside an oven set to a temperature of 50±0.1° C. The actuator and sensor were circular in shape, and their magnets were of opposite polarities, requiring no fixture to correctly dispose them during the experiment. An experiment was carried out that was similar in all key aspects to the experiment described in Examples 2 and 3, but at the higher temperature.

The data generated in Examples 2 through 4 were very useful for developing kinetic models for determining degree of cure of the pre-impregnated epoxy-glass fiber material as a function of time and temperature.

Example 5: 96.3 mg of degassed Epon 828 epoxy resin plus Jeffamine D230 curing agent was introduced between the actuator and sensor of the device, inside an oven set to a temperature of 30±0.1° C. The actuator and sensor were rectangular in shape, and their magnets were of the same polarity, requiring a fixture to correctly dispose them during the experiment. The top and bottom parts of the fixture were adhesively bonded together using cyanoacrylate glue (super-glue) before starting the experiment. The experiment was run inside the oven overnight, whilst sensor output waveform data was acquired every 6 minutes. The experimental data showed an initial value of $f_0^*$=218.0 Hz, with a steady decrease in f* as a function of time, reaching a limiting value of $f_\infty^*$=31.9 Hz after 3.1 hours at which point the material under test was considered fully cured.

Example 6: 95.3 mg of degassed Epon 828 epoxy resin plus Jeffamine D230 curing agent was introduced between the actuator and sensor of the device, inside an oven set to a temperature of 40±0.1° C. The actuator and sensor were rectangular in shape, and their magnets were of the same polarity, requiring a fixture to correctly dispose them during the experiment. The top and bottom parts of the fixture were adhesively bonded together using cyanoacrylate glue (super-glue) before starting the experiment. An experiment was carried out that was similar in all key aspects to the experiment described in Example 5, but at the higher temperature. The experimental data showed an initial value of $f_0^*$=279.3 Hz, with a steady decrease in f* as a function of time, reaching a limiting value of $f_\infty^*$=23.2 Hz after 2.6 hours at which point the material under test was considered fully cured.

Example 7: 99.9 mg of degassed Epon 828 epoxy resin plus Jeffamine D230 curing agent was introduced between the actuator and sensor of the device, inside an oven set to a temperature of 45±0.1° C. The actuator and sensor were rectangular in shape, and their magnets were of the same polarity, requiring a fixture to correctly dispose them during the experiment. The top and bottom parts of the fixture were adhesively bonded together using cyanoacrylate glue (super-glue) before starting the experiment. An experiment was carried out that was similar in all key aspects to the experiment described in Examples 5 and 6, but at the higher temperature. The experimental data showed an initial value of $f_0^*$=252.9 Hz, with a steady decrease in f* as a function of time, reaching a limiting value of $f_\infty^*$=29.5 Hz after 1.7 hours at which point the material under test was considered fully cured.

The data generated in Examples 5 through 7 were very useful for developing kinetic models for determining degree of cure of the degassed epoxy resin material.

The degree of cure (DOC) as a function of time and temperature (Table 2) was calculated based on the following relationship:

$$DOC = 1 - \left(\frac{f^* - f_\infty^*}{f_0^* - f_\infty^*}\right)$$

Here, $f_0^*$ was the initial recorded value off at time t=0 and $f_\infty^*$ was the final recorded value of f* when the material was considered fully cured.

TABLE 2

| Elapsed time [hours] | Degree of Cure (30° C. experiment) | Degree of Cure (40° C. experiment) | Degree of Cure (45° C. experiment) |
|---|---|---|---|
| 0.0 | 0.00 | 0.00 | 0.00 |
| 0.1 | 0.00 | 0.00 | 0.00 |
| 0.2 | 0.00 | 0.00 | 0.00 |
| 0.3 | 0.06 | 0.06 | 0.05 |
| 0.4 | 0.06 | 0.06 | 0.05 |
| 0.5 | 0.11 | 0.11 | 0.11 |
| 0.6 | 0.14 | 0.14 | 0.15 |
| 0.7 | 0.16 | 0.16 | 0.20 |
| 0.8 | 0.21 | 0.21 | 0.25 |
| 0.9 | 0.26 | 0.26 | 0.33 |
| 1.0 | 0.30 | 0.30 | 0.40 |
| 1.1 | 0.34 | 0.35 | 0.47 |
| 1.2 | 0.38 | 0.39 | 0.56 |
| 1.3 | 0.41 | 0.42 | 0.64 |
| 1.4 | 0.45 | 0.46 | 0.75 |
| 1.5 | 0.48 | 0.49 | 0.81 |
| 1.6 | 0.53 | 0.54 | 0.91 |
| 1.7 | 0.58 | 0.59 | 1.00 |
| 1.8 | 0.62 | 0.63 | — |
| 1.9 | 0.65 | 0.66 | — |
| 2.0 | 0.70 | 0.71 | — |
| 2.1 | 0.75 | 0.76 | — |
| 2.2 | 0.80 | 0.81 | — |
| 2.3 | 0.85 | 0.87 | — |
| 2.4 | 0.90 | 0.91 | — |
| 2.5 | 0.94 | 0.96 | — |
| 2.6 | 0.98 | 1.00 | — |
| 2.7 | 0.98 | — | — |
| 2.8 | 0.99 | — | — |
| 2.9 | 1.00 | — | — |
| 3.0 | 0.99 | — | — |
| 3.1 | 1.00 | — | — |

Example 8: 88 mg of solvated high-temperature polymer resin was introduced between the actuator and sensor of the device, inside an oven set to a temperature of 40±0.1° C. The actuator and sensor were rectangular in shape, and their magnets were of the same polarity, requiring a fixture to correctly dispose them during the experiment. The top and bottom parts of the fixture were adhesively bonded together using cyanoacrylate glue (super-glue) before starting the experiment. The experiment was run inside the oven for ~20 days, whilst sensor output waveform data was acquired periodically every 10 hours. The experimental data showed an initial value of $f_0^*$=505.9 Hz, with a steady increase in f* as a function of time up to 1,534.0 Hz after 18.8 days as the mass of the specimen decreased due to evaporation of the solvent and the stiffness of the specimen increased due to the slow imidization chemical reaction occurring in the resin. The experiment was terminated, but additional micro-viscometry experiments were run out to longer times of ~39 days to generate longer-term data. Independent measurements of the mass loss of similarly-disposed resin specimens were obtained through thermogravimetric analysis. The absolute value of the storage modulus of the resin over time was calculated by combining both the viscometry data and the mass loss data, according to the following relationship:

$$\frac{G'}{G'_0} = \left(\frac{\rho}{\rho_0}\right)\left(\frac{f^*}{f_0^*}\right)^2$$

Here, G' is the storage modulus; $G_0'$ is the initial storage modulus measured independently using a parallel plate rheometer; $\rho$ is the density of the resin; $\rho_0$ is the initial density of the resin; f* and $f_0^*$ have their usual meaning. These data are included in Table 3.

TABLE 3

| Elapsed time [days] | G'/G'$_0$) [no units] |
|---|---|
| 0.0 | 1.00 |
| 0.4 | 1.43 |
| 0.8 | 1.83 |
| 1.3 | 2.04 |
| 1.7 | 2.45 |
| 2.1 | 2.77 |
| 2.5 | 3.07 |
| 2.9 | 3.40 |
| 3.3 | 3.76 |
| 3.8 | 4.16 |
| 4.2 | 4.60 |
| 4.6 | 4.71 |
| 5.0 | 5.00 |
| 5.4 | 5.01 |
| 5.8 | 5.54 |
| 6.3 | 5.55 |
| 6.7 | 6.13 |
| 7.1 | 6.14 |
| 7.5 | 6.27 |
| 7.9 | 6.79 |
| 8.3 | 6.80 |
| 8.8 | 7.22 |
| 9.0 | 7.52 |
| 9.2 | 7.52 |
| 9.6 | 7.53 |
| 10.0 | 7.54 |
| 10.4 | 7.54 |
| 10.8 | 8.17 |
| 11.3 | 8.34 |
| 11.7 | 8.35 |
| 12.1 | 8.35 |
| 12.5 | 8.36 |
| 12.9 | 8.37 |
| 13.3 | 8.37 |
| 13.8 | 8.72 |
| 14.2 | 9.26 |
| 14.6 | 9.26 |
| 15.0 | 9.27 |
| 15.4 | 9.27 |
| 15.8 | 9.65 |
| 16.3 | 9.66 |
| 16.7 | 9.86 |
| 17.1 | 10.06 |
| 17.5 | 10.27 |
| 17.9 | 10.28 |
| 18.3 | 10.28 |
| 18.8 | 10.29 |

These data are very useful for industry in developing kinetic models for degradation of high-temperature polymer resins at low temperatures over long times.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of determining the rate of chemical cure, change in tack, and/or rate of mass loss of a known mass of material using a device comprising an actuator and a sensor:
   a) said sensor comprising a frame, a magnet, a coil having an electrical connection and a membrane having a periphery, said magnet, coil and membrane being disposed in said frame, said membrane being further physically connected to said frame at said membrane's periphery, said coil being concentric to said magnet but not in physical contact with said magnet, said coil being bonded to said membrane said membrane not being in physical contact with said magnet, said magnet being attached to said frame opposite of said membrane;
   b) said, actuator comprising a frame, a magnet, a coil having an electrical connection and a membrane having a periphery, said membrane being further physically connected to said frame at said membrane's periphery said coil being concentric to said magnet but not in physical contact with said magnet, said coil being bonded to said membrane, said membrane not being in physical contact with said magnet, said magnet being attached to said frame opposite of said membrane;
   said sensor's magnet and said actuator's magnet having opposite polarities or sensor's magnet and said actuator's magnet having the same polarities, when said sensor's magnet and said actuator's magnet have the same polarities said device further comprising a fixture in which said sensor and said actuator are disposed;
said method comprising measuring the phase lag between a first and a second signal, said first signal being a signal from said device's alternating current signal source and said second signal being a signal from said device's sensor, said known mass of material being disposed between said device's actuator and said device's sensor.

2. A method according to claim 1 wherein said first signal has a frequency of from about 0.02 hertz to about 20 kilohertz.

3. The method of claim 1 wherein said first signal is an alternating current signal and said second signal is an alternating current signal.

4. The method of claim 3 wherein said first signal is a sine wave.

5. A method of determining the rate of chemical cure, change in tack, and/or rate of mass loss of a known mass of material using a device comprising an actuator and a sensor:
   a) said sensor comprising a frame, a magnet, a coil having an electrical connection and a membrane having a periphery, said magnet, coil and membrane being disposed in said frame, said membrane being further physically connected to said frame at said membrane's periphery, said coil being concentric to said magnet but not in physical contact with said magnet, said coil being bonded to said membrane said membrane not being in physical contact with said magnet, said magnet being attached to said frame opposite of said membrane; said sensor's
      (i) frame comprising a non-magnetic metal and/or a ceramic;
      (ii) magnet having a Curie temperature above the Curie temperature above the operational temperature of said device;
      (iii) coil having a modulus of elasticity and tensile strength at the operational temperature of said device that is at least 75% of the modulus of elasticity and tensile strength of said coil at 25° C.; and
      (iv) membrane having a modulus of elasticity and tensile strength at the operational temperature of said device that is at least 75% of the modulus of elasticity and tensile strength of said coil at 25° C.;
   b) said, actuator comprising a frame, a magnet, a coil having an electrical connection and a membrane having a periphery, said membrane being further physically connected to said frame at said membrane's periphery said coil being concentric to said magnet but not in physical contact with said magnet, said coil being bonded to said membrane, said membrane not being in physical contact with said magnet, said magnet being attached to said frame opposite of said membrane; said actuator's
      (i) frame comprising a non-magnetic metal and/or a ceramic;
      (ii) magnet having a Curie temperature above the Curie temperature above the operational temperature of said device;
      (iii) coil having a modulus of elasticity and tensile strength at the operational temperature of said device that is at least 75% of the modulus of elasticity and tensile strength of said coil at 25° C.; and
      (iv) membrane having a modulus of elasticity and tensile strength at the operational temperature of said device that is at least 75% of the modulus of elasticity and tensile strength of said coil at 25° C.;
   said sensor's magnet and said actuator's magnet having opposite polarities or sensor's magnet and said actuator's magnet having the same polarities, when said sensor's magnet and said actuator's magnet have the same polarities said device further comprising a fixture in which said sensor and said actuator are disposed said fixture, comprising a non-magnetic metal and/or a ceramic;
   said method comprising measuring the phase lag between a first and a second signal, said first signal being a signal from said device's alternating current signal source and said second signal being a signal from said device's sensor, said known mass of material being disposed between said device's actuator and said device's sensor.

6. The method of claim 5 wherein said device has an operational temperature of from about 60° C. to about 500° C.

7. The method of claim 6 wherein said device has an operational temperature of from about 190° C. to about 500° C.

8. The method of claim 5 wherein said device has an operational temperature of from about −196° C. to about 0° C.

9. The method of claim 8 wherein said device has an operational temperature of from about −196° C. to about −60° C.

* * * * *